United States Patent
Cutsforth (10) Patent No.: US 7,916,038 B2
(45) Date of Patent: Mar. 29, 2011

(54) MONITORING SYSTEMS AND METHODS FOR MONITORING THE CONDITION OF ONE OR MORE COMPONENTS OF AN ELECTRICAL DEVICE

(75) Inventor: Robert S. Cutsforth, Bellingham, WA (US)

(73) Assignee: Cutsforth Products, Inc., Cohasset, MN (US)

( * ) Notice: Subject to any disclaimer, the term of this patent is extended or adjusted under 35 U.S.C. 154(b) by 0 days.

(21) Appl. No.: 12/728,698

(22) Filed: Mar. 22, 2010

(65) Prior Publication Data

US 2010/0171825 A1    Jul. 8, 2010

Related U.S. Application Data

(63) Continuation of application No. 11/752,960, filed on May 24, 2007, now Pat. No. 7,705,744.

(51) Int. Cl.
*G08B 21/00* (2006.01)
(52) U.S. Cl. .......... 340/686.1; 340/686.3; 340/648
(58) Field of Classification Search .......... 340/635, 340/653, 679, 686.1, 686.2, 686.3, 686.4, 340/539.1, 648; 324/71.1, 699; 250/504 R
See application file for complete search history.

(56) References Cited

U.S. PATENT DOCUMENTS

| | | | |
|---|---|---|---|
| 3,523,288 A | 8/1970 | Thompson | |
| 4,024,525 A | 5/1977 | Baumgartner | |
| 4,121,207 A | 10/1978 | Jones | |
| 4,172,988 A | 10/1979 | Lowther | |
| 4,272,695 A | 6/1981 | Buchwald et al. | |
| 4,316,186 A | 2/1982 | Purdy et al. | |
| 4,329,611 A | 5/1982 | Ohmstedt et al. | |
| 4,329,683 A | 5/1982 | Kimberlin | |
| 4,333,095 A | 6/1982 | Silva | |
| 4,334,072 A | 6/1982 | Becker et al. | |
| 4,344,009 A | 8/1982 | Reynolds | |
| 4,348,608 A | 9/1982 | Michael | |
| 4,390,870 A | 6/1983 | Michael | |
| 4,420,705 A | 12/1983 | Kimberlin | |
| 4,488,078 A | 12/1984 | Orton | |
| 4,513,495 A | 4/1985 | Kimberlin | |
| 4,528,556 A | 7/1985 | Maddox | |
| 4,528,557 A | 7/1985 | Braun | |
| 4,536,670 A | 8/1985 | Mayer | |
| 4,542,374 A | 9/1985 | Kollmannsberger | |
| 4,577,151 A | 3/1986 | Tanisaka | |
| 4,636,778 A | 1/1987 | Corkran et al. | |
| 4,646,001 A | 2/1987 | Baldwin et al. | |

(Continued)

FOREIGN PATENT DOCUMENTS

CN    1442683 A    9/2003

(Continued)

*Primary Examiner* — Van T. Trieu
(74) *Attorney, Agent, or Firm* — Seager, Tufte & Wickhem, LLC (57) ABSTRACT

Methods and systems for monitoring a component of an electrical device and/or a brush of a brush holder assembly are disclosed. One method includes receiving data from a plurality of remote monitoring locations at a central control unit, where the data may be evaluated in order to monitor states of brushes or other components of an electrical device at a plurality of remote electrical facilities. For example, multiple images of a component of an electrical device may be acquired. A comparison of the images, for example, a comparative imaging technique, such as pixel-by-pixel comparison or visual observation, may then be performed in order to evaluate a condition of the brush or other component, such as a threshold and/or anomalous condition of the brush or other component.

15 Claims, 2 Drawing Sheets

U.S. PATENT DOCUMENTS

| | | |
|---|---|---|
| 4,652,783 A | 3/1987 | Cheesmore |
| 4,723,084 A | 2/1988 | Reynolds |
| 4,739,208 A | 4/1988 | Kimberlin |
| 4,743,787 A | 5/1988 | Bunner |
| 4,761,594 A | 8/1988 | Rodi et al. |
| 4,918,348 A | 4/1990 | Fitzsimmons |
| 4,950,933 A | 8/1990 | Pipkin et al. |
| 4,977,345 A | 12/1990 | Toperzer |
| 5,488,261 A | 1/1996 | Swoboda et al. |
| 5,509,625 A | 4/1996 | Oullette |
| 5,731,650 A | 3/1998 | Scheucher |
| 5,753,995 A | 5/1998 | Ogino |
| 5,870,026 A | 2/1999 | Challenger |
| 6,034,531 A | 3/2000 | Senglat |
| 6,067,159 A | 5/2000 | Discenzo et al. |
| 6,111,643 A | 8/2000 | Discenzo et al. |
| 6,255,955 B1 | 7/2001 | Blaettner |
| 6,359,690 B1 | 3/2002 | Discenzo |
| 6,495,940 B2 | 12/2002 | Kliman et al. |
| 6,580,511 B1 | 6/2003 | Discenzo |
| 6,933,650 B2 | 8/2005 | Wang |
| 6,960,922 B2 | 11/2005 | Klaar |
| 7,010,959 B2 | 3/2006 | Dingfelder et al. |
| 7,045,929 B2 | 5/2006 | Yu |
| 7,049,532 B2 | 5/2006 | Kanazawa |
| 7,485,882 B2 | 2/2009 | Zombo et al. |
| 2005/0116475 A1 | 6/2005 | Hibi et al. |
| 2008/0291273 A1 | 11/2008 | Cutsforth et al. |

FOREIGN PATENT DOCUMENTS

| | | |
|---|---|---|
| DE | 3417711 A1 | 11/1985 |
| DE | 202006003418 U1 | 6/2006 |
| EP | 0099158 B1 | 1/1984 |
| EP | 1090702 A2 | 4/2001 |
| EP | 1271716 A | 1/2003 |
| GB | 2172445 A | 9/1986 |
| JP | 60-39337 A | 3/1985 |
| WO | 02/19698 A2 | 3/2002 |

MONITORING SYSTEMS AND METHODS FOR MONITORING THE CONDITION OF ONE OR MORE COMPONENTS OF AN ELECTRICAL DEVICE

REFERENCE TO RELATED APPLICATIONS

This application is a continuation of U.S. patent application Ser. No. 11/752,960, filed May 24, 2007 now U.S. Pat. No. 7,705,744 which is incorporated herein by reference.

TECHNICAL FIELD

The disclosure generally relates to monitoring systems for monitoring one or more components of an electrical device, such as an electrical generator. More specifically, the disclosure relates to monitoring apparatus, assemblies, systems and methods of monitoring one or more components of an electrical device, such as monitoring the condition of a brush of a brush holder assembly, by evaluating images of a component of an electrical device.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, or sliding connection applications, for example, slip ring assemblies on a rotating machine such as a rotating crane or a linear sliding connection on a monorail. Brushes in many electrical devices are blocks or other structures made of conductive material, such as graphite, carbon graphite, electrographite, metal graphite, or the like, that are adapted for contact with a conductive surface or surfaces to pass electrical current.

In some designs, a brush box type brush holder, or other type of brush holder, may be used to support a brush in contact with a moving contact surface of an electrical device during operation. The brush and brush box may be designed such that the brush can slide within the brush box to provide for continuing contact between the brush and the moving contact surface contacted by the brush. During operation an anomalous and/or threshold condition may occur, which may be indicative that one or more components of the electrical device may need to be replaced, one or more components of the electrical device may require inspection or attention, and/or maintenance may need to be performed. For example, an anomalous and/or threshold condition may indicate that one or more of a brush, brush holder, spring, shunt, commutator, collector ring, and/or other component may need to be replaced, one or more of a brush, brush holder, spring, shunt, commutator, collector ring, and/or other component may need to be inspected, and/or maintenance may need to be performed. It would be advantageous to monitor one or more components of an electrical device in order to observe the occurrence of an anomalous and/or threshold condition. Furthermore, it would be advantageous to alert an operator and/or technician of the occurrence of an anomalous and/or threshold condition and/or schedule technician intervention.

SUMMARY

Some embodiments relate to an apparatus, assemblies, systems and/or methods for monitoring one or more components of an electrical device and/or detecting an anomalous and/or threshold condition of a brush holder assembly.

Accordingly, one exemplary embodiment relates to a method of monitoring one or more components of an electrical device and/or detecting the condition of a brush in a brush holder assembly. The method may include sending data from one or more, or a plurality of remote monitoring locations to a central control unit, where the data may be evaluated in order to monitor the condition of brushes of brush holder assemblies at a plurality of remote facilities.

Another exemplary embodiment relates to a method of monitoring one or more components of an electrical device and/or monitoring the condition of one or more brushes in a brush holder assembly. A signal representing an image of a component of the electrical device may be generated by an imaging device in proximity to the electrical device and then inputted to a processing unit. The signal may then be analyzed in order to determine a condition of the brush of the brush holder assembly, such as an anomalous and/or threshold condition of the brush holder assembly. In some instances, an output signal may be generated to alert personnel of an anomalous and/or threshold condition of the brush, or schedule technician intervention.

Another exemplary embodiment relates to a method of determining an anomalous and/or threshold condition of a component of an electrical device, such as a brush of a brush holder assembly. The method may include acquiring a first image of a component of the electrical device. After acquiring a second or subsequent image of the component of the electrical device, a comparison of the first image and the second image using a comparative imaging technique, such as pixel-by-pixel comparison or visual inspection, may be performed in order to evaluate a condition of the electrical device, such as an anomalous and/or threshold condition of a brush of a brush holder assembly.

Another exemplary embodiment relates to a system for monitoring one or more components of an electrical device and/or monitoring a condition of a brush in a brush holder assembly. The system may include an imaging device in line of sight of a component of the electrical device and/or the brush holder assembly and a processing unit for receiving data constituting images generated by the imaging device.

Another exemplary embodiment relates to a system for monitoring one or more components of an electrical device and/or monitoring the condition of brushes of brush holder assemblies. The system may include a plurality of remote monitoring locations, wherein each remote monitoring location generates data representing an image of a component of the electrical device, such as a commutator, a collector ring and/or a brush of the electrical device, located at the remote monitoring location, and a central control unit for receiving the data from the plurality of remote monitoring locations.

The above summary of some example embodiments is not intended to describe each disclosed embodiment or every implementation of the invention.

BRIEF DESCRIPTION OF THE DRAWINGS

The invention may be more completely understood in consideration of the following detailed description of various embodiments in connection with the accompanying drawings, in which.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Figure 1:
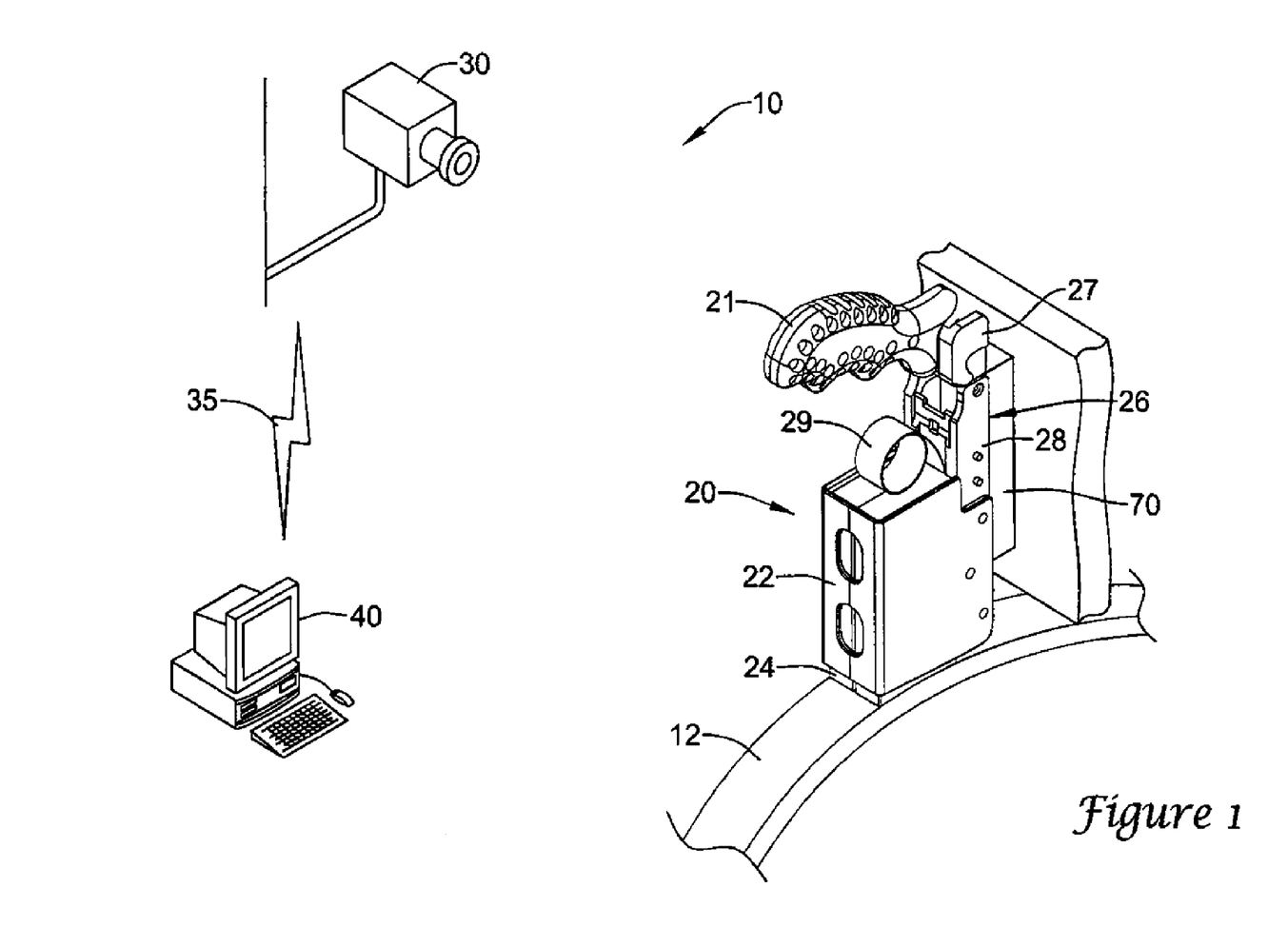
FIG. 1 is an illustrative view of an exemplary brush monitoring system.

Now referring to FIG. 1, an illustrative system for monitoring a component of an electrical device and/or monitoring the condition of a brush of a brush holder assembly is shown. In some embodiments, the monitoring system may resemble a monitoring system as described in U.S. Patent Application entitled "Brush Holder Assembly Monitoring Apparatus, Assembly, System and Method" filed on the same date as the present application and assigned Ser. No. 11/752,965, which is herein incorporated by reference in its entirety. The monitoring system 10 includes a signal generating device such as an imaging device 30, or a plurality of imaging devices 30, and a processing unit 40 or a plurality of processing units 40 for monitoring a component of an electrical device. In some embodiments, the brush holder assembly 20 may substantially resemble a brush holder assembly as described in U.S. patent application Ser. No. 10/322,957, entitled "Brush Holder Apparatus, Brush Assembly, and Method", which is herein incorporated by reference in its entirety. However, the illustrative monitoring system 10 may be amenable to any of various electrical devices and/or brush holder assembly configurations of an electrical device, such as an industrial electrical generator. For example, the disclosed monitoring system 10 may be used with brush holder assemblies, brush holders and/or brushes disclosed in U.S. Pat. Nos. 6,731,042; 5,753,992; 5,621,262; 5,463,264; 5,397,952; and 5,256,925; each of which is incorporated herein by reference.

The imaging device 30, which may be a camera, a video camera, an infra-red camera, a web-cam, a thermal imaging device or other such imaging device, may be able to capture an analog and/or digital image of a component of an electrical device, such as a commutator or collector ring of the electrical device, or the brush 24 of the brush holder assembly 20 and/or other portions of the brush holder assembly 20. For example, the imaging device 30 may be positioned in proximity to the brush holder assembly 20 such that the imaging device 30 may be in an unobstructed visual pathway (e.g., line of sight) to the moving (e.g., rotating or sliding) contact surface 12 (e.g., the commutator or collector ring), the brush 24 and/or another portion of the brush holder assembly 20. In applications where multiple brush holder assemblies 20 and/or brushes 24 are present, multiple imaging devices 30 may be needed in order to sufficiently monitor the plurality of brush holder assemblies 20 and/or brushes 24. For example, a plurality of imaging devices 30 may be located at multiple radial directions from an electrical device, such as an industrial generator and/or electrical motor, in order to obtain a visual pathway to a moving contact surface 12 (e.g., commutator or collector ring) corresponding to and associated with a plurality of brushes 24 of multiple brush holder assemblies 20 positioned radially about the moving contact surface 12, such as a collector ring or a commutator of the electrical equipment. In some embodiments, an imaging device 30 may be associated with each moving contact surface 12 of an electrical device. In some applications, a single imaging device 30 may accommodate a plurality of moving contact surfaces 12, brushes 24 and/or brush holder assemblies 20. For example, in some embodiments, a single analog and/or digital image may be used to evaluate the condition of a plurality of brushes 24. For example, in some applications, a bank of a plurality of brushes 24 may be positioned at a single and/or similar radially located position about a component, such as a commutator or a collector ring, of an electrical device. Thus, a single imaging device 30 may capture the contact surface(s) 12 (e.g., the commutator or collector ring) corresponding to and associated with each of the plurality of brushes 24 configuring the bank of brushes 24 in a single analog and/or digital image.

In some embodiments, an imaging device 30 may be positioned to capture images of a marker 50, brush 24 and/or another portion of a brush holder assembly 20 of a plurality of brushes, brush holders and/or brush holder assemblies of an electrical device (e.g., electrical generator). In such embodiments, evaluation of images taken of the marker 50, brush 24 and/or other portion of the brush holder assembly 20 may be representative of other brushes, brush holders and/or brush holder assemblies of the electrical device. Thus, if an anomalous or threshold condition is detected regarding the monitored marker 50, brush 24 and/or other portion of the brush holder assembly 20, an inference or assessment may be made that other brushes, brush holders and/or brush holder assemblies of the electrical device may, similarly, require inspection, maintenance, replacement, etc. Thus, a single imaging device 30 may be used to monitor a plurality of brushes, brush holders and/or brush holder assemblies by acquiring images of one of the plurality of brushes, brush holders and/or brush holder assemblies.

The imaging device 30 may communicate with a processing unit 40 in order to send or transmit a signal 35, such as analog and/or digital images, to the processing unit 40. For example, the imaging device 30 may be wired to the processing unit 40, or the imaging device 30 may send or transmit data representing analog and/or digital images to the processing unit 40 remotely and/or wirelessly. In some embodiments, the processing unit 40 may be located in the same location (e.g., same room, building, facility, etc.) as the imaging device 30, or the processing unit 40 may be located at a location remote from the imaging device 30 (e.g., different building, facility, city, county, state, country, etc.).

Moreover, in some embodiments a processing unit 40 may be located on-site with an associated imaging device 30 communicating with the processing unit 40. In describing that the processing unit 40 may be located on-site with an associated imaging device 30, what is meant is that the processing unit 40 may be located at the same site or location (e.g., same electrical facility) in which the imaging device 30 is located. In other embodiments, a processing unit 40 may be located off-site from an associated imaging device 30 communicating with the processing unit 40. In describing that the processing unit 40 may be located off-site from an associated imaging device 30, what is meant is that the processing unit 40 may be located at a different or distant site or location (e.g., distant of the electrical facility) from the site or location in which the imaging device 30 is located.

In some embodiments, the monitoring system 10 may include a data communications network, such as a Local Area Network (LAN), for example a wired LAN or a wireless LAN, or the Internet, connecting multiple imaging devices 30 and/or multiple processing units 40. Thus, the processing unit 40 and/or a control unit 100 (in some embodiments the control unit 100 may include the processing unit 40) may be in a centralized location networked to the monitoring system 10 acquiring multiple analog and/or digital images or signals from multiple imaging devices 30 simultaneously, sequentially, periodically, intermittently, selectively and/or manually, for example.

Figure 2:
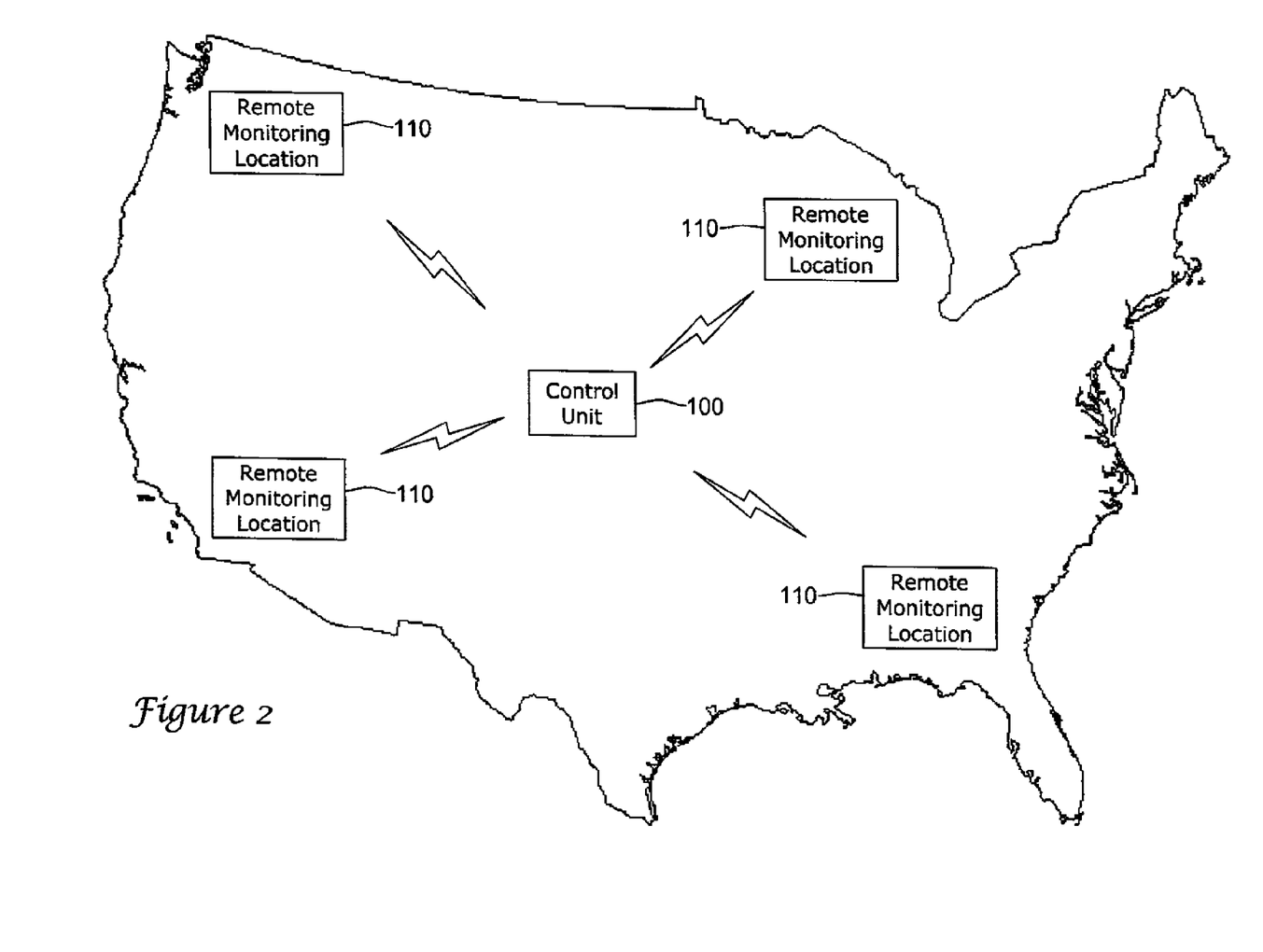
FIG. 2 is an illustrative representation of a network of remote monitoring locations communicating with a control unit.

As shown in FIG. 2, in some embodiments, images or data signals sent or transmitted from multiple remote monitoring locations 110, each having one or more, or a plurality of, imaging devices 30 and/or processing units 40 of a monitoring system 10, may be sent or transmitted to one or more central control units 100 for processing and/or evaluation. When describing the one or more control units 100 as being in a centralized location, it is not intended to limit the control unit 100 to a location equidistant to all the remote monitoring locations 110, although this arrangement may be realized in some embodiments. The intention when describing the control unit 100 as a central control unit is to describe the control unit 100 as a site for consolidating data transmitted from multiple remote locations 110. Thus, in some embodiments the control unit 100 may be described as a master control center. It is noted that the intention is not to be limited to a single control unit 100, as multiple control units 100, each receiving data from one or a plurality of remote locations 110, may be located at different locations. For example, multiple control units 100 may be dispersed state-by-state, regionally, country-by-country, or other chosen geographical area.

The processing unit 40, which may be a personal computer or other computer, a server, a controller, a tuner, a converter, or other device, or combinations and/or multiples thereof, receives the signal 35, such as data representing an analog and/or digital image, sent from the imaging device 30. The processing unit 40 may then display the image and/or automatically, manually, and/or selectively evaluate the data using an algorithm, or other evaluation technique, to analyze a parameter, such as the position of the brush 24, coloration (e.g., discoloration) of a component such as a commutator or collector ring, and/or the level of emitted radiation of a component such as a brush, a commutator or a collector ring in order to determine a condition of a component of the electrical device or the brush 24, such as an anomalous and/or threshold condition of a brush 24, for example, or others. In some embodiments, the processing unit 40 may include a monitor which may be used to display the analog and/or digital images received. The processing unit 40 may also be configured to inform a user of a condition of the electrical device, such as the state of the brush, and/or alert, notify, schedule and/or advise maintenance, part delivery, on site inspection, and/or other task, shut down the system, and/or otherwise perform a consultative and/or responsive function in view of the determined condition of the brush 24 or other component of the electrical device.

The brush holder assembly 20, for example as shown in FIG. 1, may include a brush holder 22, such as a brush box, surrounding a brush 24 on several sides and including a plurality of guiding surfaces for guiding linear or longitudinal movement of the brush 24. In some embodiments, the brush holder 22 may not take on the form of a box, but may include one or a plurality of guiding surfaces, such as channels, posts or columns, abutting and/or encompassing one or more sides of the brush 24 and/or extending into or through the brush 24, or a portion thereof, for guiding linear or longitudinal movement of the brush 24.

The brush holder 22 may be secured to a mounting beam 26 configured and adapted to be mounted to another structure, such as a mounting block 70. The brush holder assembly 20 is configured to place the brush 24 in contact with a moving contact surface 12, such as a conductive surface of a commutator or a collector ring, and conduct current therefrom. The brush 24 may extend from the lower edge of the brush holder 22 such that a wear surface of the brush 24 engages the moving contact surface 12. The mounting beam 26 may include an over-center engagement mechanism, a slotted or channeled engagement mechanism for sliding engagement, or other mechanism for easily engaging and disengaging the brush 24 from a moving contact surface 12, such as the conductive surface of a commutator or a collector ring. In other embodiments, the brush holder assembly may include a brush holder rigidly mounted to another structure holding the brush holder stationary, or mounted to another structure in any desired arrangement. For example, in some embodiments the brush holder may be bolted or welded to a stationary structure. Some such brush holders are disclosed in U.S. Pat. Nos. 6,731,042; 5,753,992; 5,621,262; 5,463,264; 5,397,952; and 5,256,925; which are incorporated herein by reference.

As shown in FIG. 1, the mounting beam 26 may include an upper beam member 27 and a lower beam member 28 hingedly or pivotedly coupled to one another. When the upper beam member 27 and the lower beam member 28 are aligned with one another (e.g., the longitudinal axis of the upper beam member 27 is parallel with the longitudinal axis of the lower beam member 28), the brush holder 22 may be considered to be in an engaged, or locked, position such that the brush 24 may be contiguous with or in contact with the moving contact surface 12. When the upper beam member 27 is tilted from the lower beam member 28 (e.g., the longitudinal axis of the upper beam member 27 is oblique to the longitudinal axis of the lower beam member 28), the brush holder 22 may be considered to be in a disengaged, or unlocked, position such that the brush 24 may be non-contiguous with, spaced from, or otherwise not in direct electrical contact with the moving contact surface 12. The mounting beam 26 may be removably coupled to the mounting block 70 during operation. In some embodiments, the mounting beam 26 may slidably engage with, interlock with, or otherwise be removably coupled to the mounting block 70. The mounting block 70 may be coupled to, secured to, or otherwise extend from another structure which maintains the mounting block 70 stationary with respect to the moving contact surface 12, for example.

In some embodiments, a handle 21 may be attached to the brush holder 22 to facilitate engagement and disengagement of the brush 24 from the moving contact surface 12. For example, the handle 21 may be attached to the upper beam member 27 such that movement of the handle 21 actuates (e.g., pivots, slides, releases) the upper beam member 27 relative to the lower beam member 28. The handle 21 may be a removable handle or the handle 21 may be permanently attached to the upper beam member 27 or another portion of the brush holder 22.

Also illustrated in FIG. 1 is a brush spring 29, such as a constant force spring, which provides tension to the brush 24 to bias the brush 24 toward and in contact with the moving contact surface 12. The spring 29 may be attached to a portion of the brush holder 22 or the mounting beam 26 of the brush holder assembly 20, for example. In some embodiments, the spring 29 may extend along one side surface of the brush 24 between the brush 24 and the mounting beam 26 of the brush holder assembly 20.

The imaging device 30 may capture an analog and/or digital image of one or more components of the electrical device. For instance, the imaging device 30 may capture an image of the moving contact surface 12 (e.g., the commutator or collector ring) of the electrical device and/or a brush 24 of a brush holder assembly 20, or another component of the electrical device. In some embodiments, at a temporal occasion the imaging device 30 may capture images of the moving contact surface 12 at about one-half inch increments, about 1 inch increments, about 2 inch increments, about 3 inch increments, or about 4 inch increments around the circumference of the moving contact surface 12, for example. The image may be a black-and-white image, a gray scale image, a color image, or a thermograph (e.g., an image depicting levels of emitted radiation), for example.

In one embodiment, the imaging device 30, which may detect energy in the visible light spectrum, may generate a data signal which may be processed and/or may be converted into an image. With such an imaging device 30, evaluation of the coloration (e.g., discoloration) of the moving contact surface 12, or other component of the electrical device may be performed in order to determine a condition of a brush 24 of a brush holder assembly 20, a collector ring or commutator, or other component of an electrical device. For instance, the imaging device 30 may be used to identify abnormal coloration of the moving contact surface 12.

During normal operating conditions the moving contact surface 12 may exhibit normal coloration. In many applications, normal coloration of the moving contact surface 12 may be a shade of gray, for example. During operation, the coloration of the moving contact surface 12 may change, which may be indicative of a threshold and/or anomalous condition of the brush 24 of the brush holder assembly 20. Such a threshold and/or anomalous condition of the brush 24 may include incidents of irregular wear, binding, arcing, burning, etching, or the like. Thus, processing and/or evaluation of a signal generated by the imaging device 30 may be used to determine whether a threshold and/or anomalous condition of the brush 24 or other component has occurred.

Thus, initially, the moving contact surface 12 may be identified as having a first color, shade or intensity of coloration. At a subsequent time, the moving contact surface may be identified as having a second color, shade or intensity of coloration different from the first color, shade or intensity of coloration. In some circumstances, the second color, shade or intensity of coloration may be less than the first color, shade or intensity of coloration. However, in other circumstances, the second color, shade or intensity of coloration may be greater than the first color, shade or intensity of coloration. For instance, lightening in color, shade or intensity of coloration of the moving contact surface 12 may be an indication of arcing, causing burning and/or etching of the moving contact surface 12. For example, in applications where normal coloration of the moving contact surface 12 may be a shade of gray, a threshold or anomalous condition may be identified when the coloration of the moving contact surface 12 changes to another shade of gray, such as a lighter or darker shade of gray.

In another embodiment, the imaging device 30, which may detect energy in the infrared spectrum, may generate a data signal which may be processed and/or may be converted into a thermal image. All objects emit radiation and the level of radiation emitted by an object increases with temperature. Therefore, an infrared camera or other thermal imaging device may be used in order to detect variations and/or changes in temperature of a component of an electrical device, such as the moving contact surface 12 of an electrical device and/or the brush 24 of a brush holder assembly 20.

During normal operating conditions, the moving contact surface 12 and/or the brush 24 of a brush holder assembly 20 may emit a given level of radiation, which may be described as a normal level of radiation. The level of emitted radiation may be depicted with a thermograph (e.g. a thermal image) through color, shade or intensity of the illustrated component. During operation, the level of radiation emitted by the moving contact surface 12 and/or the brush 24 of a brush holder assembly 20 may increase, indicating an increase in temperature of the moving contact surface 12 and/or the brush 24 of a brush holder assembly 20. Increased temperature of the moving contact surface 12 and/or the brush 24 of a brush holder assembly 20 may be indicative of a threshold and/or anomalous condition of the brush 24 or other component of the brush holder assembly 20. Such a threshold and/or anomalous condition of the brush 24 may include incidents of irregular wear, binding, arcing, burning, etching, or the like. Thus, processing and/or evaluation of a signal generated by the imaging device 30 may be used to determine whether a threshold and/or anomalous condition of the brush 24 or other component has occurred.

For instance, during normal operating conditions, the moving contact surface 12 and/or the brush 24 of a brush holder assembly 20 may typically have a surface temperature in the range of about 150° F. to about 250° F., or in the range of about 180° F. to about 200° F. Thus, a thermal image of the moving contact surface 12 and/or the brush 24 of a brush holder assembly 20 may visually depict the temperature (i.e. the level of emitted radiation) of a component of the electrical device with color, shade or intensity. As the temperature of the moving contact surface 12 and/or the brush 24 of a brush holder assembly 20 increases, the color, shade or intensity illustrative of the temperature changes accordingly. Thus, variations in the level of emitted radiation corresponding to increased or decreased temperature of a component of the electrical device may be identified through evaluation of successive thermal images showing varying levels of color, shade or intensity of a component of an electrical device, such as the moving contact surface 12 and/or the brush 24 of a brush holder assembly 20. For instance, one level of color, shade or intensity gradation of a thermal image may represent a temperature variation of about 1° F., about 2° F., about 5° F., about 10° F., or about 20° F. of the monitored component. Thus, the temperature of a monitored component may be determined through evaluation of a thermal image where the temperature associated with a given level of color, shade or intensity is known or approximated.

Processing and/or evaluation of the signal by the processing unit 40 may include an image analysis technique, such as a pixel-by-pixel comparison or visual observation, for example. However, other techniques may be used in processing and/or evaluation of data acquired. Pixel-by-pixel comparison involves comparing a first digital image with a second, or subsequent, digital image. It is noted that in using the terms "first" and "second", the terms are intended to denote the relative temporal relationship of the images only. An algorithm, for example, may be used to systematically compare data denoting pixels of one digital image with data denoting pixels of a second digital image. A pixel is the smallest independent part of a digital image and may have the properties of color, shade and/or intensity. The resolution of the digital image is determined by the quantity of pixels creating the digital image (e.g., the greater the number of pixels, the greater the resolution of the digital image). A digital image is characterized as an array of pixels. The digital image may be divided into any sized array and may be dictated by the quality of imaging equipment and/or memory available. For example, the digital image may be an 800×600, 1024×768, or 1600×1200 array of pixels. Each pixel is identified by an integer denoting the value (e.g., color, shade and/or intensity) of the individual pixel. For example, each pixel may be specified by a "0" or a "1" denoting black or white respectively; or an integer between 0 and 255 denoting 256 shades of grey; or three integers between 0 and 255 each denoting a red, blue and green component, respectively with 256 levels for each component; or an integer between 0 and 1023 denoting 1024 infra-red levels, or other identifiable values. Thus, the color, shade and/or intensity of each pixel may be denoted by a representative integer. It may be understood that the digital identification of each pixel may be determined by the number of bits available for data regarding each pixel.

A first or initial digital image may be taken of a component of the electrical device. For instance, a digital image of the rotating conductive surface 12 and/or the brush 24 may be taken with the imaging device 30. Additional digital images may be taken of a component of the electrical device at successive times as desired to conduct a comparative analysis.

The processing unit 40 may be able to evaluate the pixels of the digital images acquired to determine if an anomalous and/or threshold condition exists. In some embodiments, the processing unit 40 recognizes the known value of pixels representing the normal coloration or the normal level of emitted radiation of a component of the electrical device. Thus, evaluation of the digital images may involve assessing the value of pixels of the digital images at a given time with known values corresponding to normal coloration or level emitted radiation of a component of the electrical device. If discoloration or abnormal coloring or increased levels of emitted radiation is determined, proper notification may be performed.

A software program may be used to evaluate the digital images acquired by the imaging device 30. Thus, a software program may identify discoloration or increased levels of emitted radiation of a component of the electrical device. For example, initially a software program may process and evaluate an initial digital image capturing the initial (e.g., normal) coloration or initial (e.g., normal) level of emitted radiation of a component in order to determine and store the initial values of pixels of the digital image at time, $T_0$. The software program, which may identify the brighter components or components having a programmed, predetermined color, shade or intensity of the digital image from the other components, may determine the relative value of pixels representative of brighter components or components having a programmed, predetermined color, shade or intensity of the digital image. Thus, the software program may evaluate the color, shade and/or intensity of the pixels of the digital image in order to determine and/or store the initial coloration or level of emitted radiation of the component. In other embodiments, the software program may be configured to use other techniques to identify/recognize the initial coloration or level of emitted radiation of a component.

At a subsequent time, a second signal corresponding to a second digital image may be sent or transmitted to the processing unit 40 and processed and/or evaluated with the software program. For example, the software program may process and/or evaluate the second digital image to determine the coloration or level of emitted radiation of a component of the electrical device at time, $T_N$. In evaluating the coloration and/or level of emitted radiation of a component at time, $T_N$, the software program may evaluate the pixels of the digital image, similar to that described above regarding the evaluation of the first or initial digital image taken of the component of the electrical device. Thus, the software program may identify and/or store the coloration and/or level of emitted radiation of the component at time, $T_N$.

Additional signals (e.g., digital images) may be sent or transmitted to the processing unit 40 at subsequent times. The software program may continue to process and/or evaluate additional signals corresponding to additional digital images taken of the component of the electrical device. For example, the software program may process and/or evaluate a third digital image to determine the coloration and/or level of emitted radiation of the component at time, $T_{N+1}$. In evaluating the coloration and/or level of emitted radiation of the component at time, $T_{N+1}$, the software program may evaluate the pixels of the third digital image, similar to that described above regarding the evaluation of the first or initial digital image. Thus, the software program may identify and/or store the coloration and/or level of emitted radiation of the component at time, $T_{N+1}$. The software program may further evaluate the coloration and/or level of emitted radiation of the component in order to determine the condition of the brush 24 or other component of the electrical device at a subsequent time.

The software program may utilize the coloration and/or level of emitted radiation of the component in evaluating a condition of the brush 24. For instance, the software program, in determining the present coloration and/or level of emitted radiation relative to the coloration and/or level of emitted radiation at a previous time, may evaluate a condition of the brush 24 or other component of the electrical device. For instance, the software program may determine the value of pixels in the digital image and compare the value with corresponding values of a previous digital image.

Additional signals or digital images may be repeatedly sent from the imaging device 30 to the processing unit 40 continuously, at programmed, predetermined time intervals, at intermittent times, or additional signals or digital images may be sent from the imaging device 30 to the processing unit 40 at subsequent manually determined times, for example. For instance, in some embodiments, one or a set of images of a component of an electrical device may be taken hourly, daily, weekly, etc. to be evaluated. Thus, data from the subsequently sent digital images may be likewise evaluated by the software program.

In some embodiments, the software program may compile relevant information from a plurality of digital images taken over a period of time in order to chart the coloration and/or level of emitted radiation of the component, and thus the condition of the brush 24 or other component, over a time interval. In some embodiments, the software program may output the data compiled from evaluating the digital images in charts, graphs, tables, displays, monitors, or other forms of presenting compiled information. For example, the software program may output a notification of a threshold and/or an anomalous condition. In some embodiments, the software program may output/display a projected temporal occasion, such as date and/or time, corresponding to when the brush 24 is expected to surpass a threshold amount of wear and/or needs to be replaced. Therefore, the projected date and/or time may be used to schedule replacement of the brush 24 and/or other maintenance or inspection of the electrical equipment. Thus, the software program of the processing unit 40 may determine an estimated projection of a future condition of the brush 24 or other component of the electrical device.

In some embodiments, the software program may use modeled conditions or modeled brush wear data provided or input into the software program in order to evaluate and/or analyze a current and/or projected condition of the brush 24 or other component of the electrical device. For example, a modeled coloration and/or value representing a level of emitted radiation, and thus a threshold temperature, of a component of an electrical device may be provided or input into the software program. The software program may then compare the modeled data with actual data of the digital image sent to the software program in order to predict or determine an estimated projection of a condition of the brush 24 or other component of the electrical device into the future. Thus, the temporal occasion of surpassing a threshold condition, such as the moment when an anomalous condition is reached at a future date, may be predicted, for example. Desired notification and/or scheduling tasks may be performed in view of the projected conditions of the brush 24 or other component.

When the software program determines that a parameter, such as the threshold wear of the brush 24 has been met or is projected to be met at a future temporal occasion, the software program may output a signal. In some embodiments, the signal may alert an operator, technician and/or other personnel that the brush 24 is sufficiently worn and/or needs to be replaced, the brush 24 or other component is damaged, failure has occurred or is imminent, or other maintenance or inspection may need to be performed. In some embodiments, the output signal from the processing unit 40 or a technician may schedule maintenance or inspection, send personnel to perform maintenance or inspection, order and/or schedule distribution/delivery of a replacement brush 24 or other part, route maintenance personnel and/or product delivery to a specified location, or arrange for other notification and/or scheduling tasks be performed.

The monitoring system 10 may also be used to identify and/or notify other key maintenance, failure of the brush holder assembly 20 and/or other anomalous conditions. For example, incidents of excess heating, arcing or excess vibration, which may indicate a need to perform maintenance and/or disrupt operation of the electrical equipment, may be identified and/or assessed with the monitoring system 10. The software program may carry out an appropriate response to respond to the anomalous condition identified by the software program in an attempt to rectify the anomalous condition. In other embodiments, an operator may carry out an appropriate response to respond to an anomalous condition identified with the monitoring system 10 in an attempt to rectify the anomalous condition.

The same imaging device 30 or additional imaging devices may be used to view and/or store video or images of maintenance activities as well as scheduled or unscheduled intrusions of the equipment by personnel. This acquired data may be reviewed to help determine possible causes of anomalous functioning or failure of the equipment and/or help assess timing of events that may occur.

In other embodiments, the monitoring system 10 may send or transmit a signal (e.g., an analog or digital image) from the imaging device 30 to the processing unit 40 where the rotating conductive surface 12 and/or the brush holder assembly 20 may be monitored on a display. Thus, the rotating conductive surface 12 and/or brush holder assembly 20 may be monitored and/or determinations regarding brush wear may be made from images displayed at the processing unit 40. For example, inspection of the coloration and/or level of emitted radiation of a component of the electrical device may be performed at select temporal occasions and evaluation performed to determine conditions of the brush 24 or another component of the electrical device. In some embodiments, incidents of excess heating, arcing or excess vibration, which may indicate a need to perform maintenance and/or disrupt operation of the electrical equipment, may be identified and/or assessed with the monitoring system 10.

Thus, an operator may evaluate a condition of the brush 24 such as an anomalous condition of the brush 24 based on information acquired from images displayed at the processing unit 40. For example, the operator may determine the change in coloration and/or level of emitted radiation of the rotating conductive surface 12, which may correspond to failure of the brush 24. Thus, the operator may identify or become aware of an anomalous condition of a brush 24. The operator may make a visual observation of images sent to the processing unit and/or displayed on the monitor through any desired time interval. For instance, in some embodiments, one or a set of images of a component of an electrical device may be taken and/or viewed hourly, daily, weekly, etc. to be evaluated.

In some embodiments, the actual data may be compared with modeled data in order to predict or determine an estimated projection of a condition of the brush 24 or other component of the electrical device into the future. Thus, the temporal occasion of surpassing a threshold condition of the brush 24, such as the moment when the desired diminution of the brush prior to replacement of the brush is reached at a future date, may be predicted, for example. Desired notification and/or scheduling tasks may be performed in view of the projected conditions of the brush 24 or other component of the electrical device.

Thus, as currently disclosed a monitoring system may monitor the condition of a brush or a plurality of brushes within a brush holder assembly and/or one or more other components of an electrical equipment of a facility, such as an electricity generating facility, for example. In some embodiments, the monitoring system may remotely and/or wirelessly monitor the condition of a brush, a plurality of brushes and/or other components. A processing or control center, such as a central control center, may receive data from multiple facilities in order to monitor performance, such as brush performance (e.g., brush wear) at each of the multiple facilities. The control center may be located remote from one or more electrical facilities (e.g., in a different building, facility, city, county, state, country, etc.). A processing unit, which may be located at the control center, may use a software program and/or a monitor to analyze and/or monitor the performance of the brushes and/or other components in operation at the facilities, such as the current state of each brush in operation and/or an anomalous condition of the brushes. The software program or monitor may alert an operator, technician and/or other personnel that a brush at one of the remote electrical facilities is sufficiently worn and/or needs to be replaced, a brush at one of the remote electrical facilities is damaged, failure has occurred or is imminent, or other maintenance may need to be performed. In some embodiments, the software program, or a technician at the control center, may schedule maintenance for one of the remote electrical facilities, send personnel to perform maintenance at one of the remote electrical facilities, order and/or schedule distribution/delivery of a replacement brush or other part to one of the remote electrical facilities, route maintenance personnel and/or product delivery to a specified location, such as one of the remote electrical facilities, or arrange for other notification and/or scheduling tasks be performed at one of the remote electrical facilities or another location. Thus, the currently disclosed monitoring system may continuously monitor the state of brushes and/or other components of an electrical device at a plurality of remote locations with or without direct human observation in order to alleviate the need of monitoring personnel at each remote location until it is determined that human intervention is necessary to attend to an identified problem or matter.

Furthermore, a method of monitoring one or more components of an electrical device, such as monitoring one or more brushes, brush holders, collector rings and/or commutators, is currently disclosed. The method may include generating an image of one or more components of an electrical device with an imaging device. In some embodiments, the one or more components may include one or more of a brush, brush holder, spring, shunt, commutator, collector ring, and/or other component of the electrical device, which in some instances may be an industrial generator. The imaging device may be positioned in line of sight of the one or more components of the electrical device, such that an image of the one or more components may be obtained. A signal representative of the image may be sent or transmitted to a processing unit for evaluation. A processing unit may receive a signal representative of the image in order to evaluate a condition of the one or more components, such as evaluating the state of a brush of a brush holder assembly of the electrical device. Additional signals representative of subsequent images of the one or more components taken at selective temporal occasions may be subsequently sent or transmitted to the processing unit and the processing unit may receive such additional signals. Data of the additional signals may additionally be evaluated at the processing unit in order to further evaluate a condition of the one or more components of the electrical device.

In some embodiments, a method of monitoring one or more components of an electrical device may include monitoring a component of an electrical device at a plurality of remote facilities. A central control unit may be provided in communication with a plurality of remote monitoring locations. Data from the plurality of remote monitoring locations may be received at the central control unit. The data may be evaluated at the central control unit to monitor conditions of the electrical devices at the plurality of remote facilities. In some instances the acquired images and/or representative data may be displayed on a monitor for visual inspection, confirmation, observation, or the like.

A method of monitoring one or more components of an electrical device may include alerting an operator, technician and/or other personnel of a threshold or anomalous condition, such as that a brush at one of the remote electrical facilities is sufficiently worn and/or needs to be replaced, a brush at one of the remote electrical facilities is damaged, failure has occurred or is imminent, or other maintenance may need to be performed. In some embodiments, the method may include scheduling maintenance for one of the remote electrical facilities, sending personnel to perform maintenance at one of the remote electrical facilities, performing maintenance at one of the remote electrical facilities, ordering and/or scheduling distribution/delivery of a replacement brush or other part to one of the remote electrical facilities, routing maintenance personnel and/or product delivery to a specified location, such as one of the remote electrical facilities, or arranging for other notification and/or scheduling tasks to be performed at one of the remote electrical facilities or another location. Thus, the currently disclosed monitoring method may be utilized to continuously monitor the state of brushes and/or other components of an electrical device at a plurality of remote locations with or without direct human observation in order to alleviate the need of monitoring personnel at each remote location until it is determined that human intervention is necessary to attend to an identified problem or matter.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A method of remotely monitoring the state of one or more brushes of a brush holder assembly of an electrical generator at a first electrical facility, the method comprising:
   receiving a signal at an off-site monitoring station, the signal sent from an imaging device positioned in line of sight of the brush holder assembly at the first electrical facility, the off-site monitoring station located remotely from the first electrical facility, the signal being representative of an image of the brush holder assembly acquired by the imaging device; and
   displaying the image acquired by the imaging device on a monitor at the off-site monitoring station to determine the state of degradation of one or more brushes of the brush holder assembly.

2. The method of claim 1, further comprising:
   determining the position of one or more brushes of the brush holder assembly with the image at the off-site monitoring station.

3. The method of claim 1, wherein a marker for gauging the amount of wear of one or more brushes of the brush holder assembly is visible in the image.

4. The method of claim 1, further comprising:
   notifying personnel at the first electrical facility of an anomalous or threshold condition of one or more brushes of the brush holder assembly.

5. The method of claim 1, further comprising:
   scheduling delivery of one or more replacement brushes to the first electrical facility.

6. The method of claim 1, further comprising:
   routing personnel to the first electrical facility to perform maintenance of the brush holder assembly.

7. The method of claim 1, further comprising:
   receiving a second signal at the off-site monitoring station, the second signal sent from a second imaging device positioned in line of sight of a brush holder assembly at a second electrical facility remote from the first electrical facility, the off-site monitoring station located remotely from the second electrical facility, the signal being representative of an image of the brush holder assembly acquired by the second imaging device; and
   displaying the image acquired by the second imaging device on the monitor at the off-site monitoring station to determine the state of degradation of one or more brushes of the brush holder assembly at the second electrical facility.

8. The method of claim 1, wherein the imaging device is used to monitor the state of degradation of a plurality of brushes of the brush holder assembly.

9. The method of claim 1, analyzing the image with a software program at the off-site monitoring station to determine the state of degradation of one or more brushes of the brush holder assembly.

10. A system for remotely monitoring the state of one or more brushes of a brush holder assembly of an electrical generator at a first electrical facility, the system comprising:
   a first imaging device positioned in line of sight of the brush holder assembly at the first electrical facility for acquiring images of the position of one or more brushes of the brush holder assembly at the first electrical facility; and
   an off-site monitoring station located remotely from the first imaging device, the off-site monitoring station including a processor for receiving a signal sent from the first imaging device representative of an image acquired by the first imaging device and a monitor for displaying the image acquired by the first imaging device to determine the state of degradation of one or more brushes of the brush holder assembly at the first electrical facility.

11. The system of claim 10, further comprising:
   a second imaging device positioned in line of sight of a brush holder assembly at a second electrical facility for acquiring images of the position of one or more brushes of the brush holder assembly at the second electrical facility, the second electrical facility located in a different geographical location from the first electrical facility;
   wherein the off-site monitoring station is configured to receive a signal sent from the second imaging device representative of an image acquired by the second imaging device used to determine the state of degradation of one or more brushes of the brush holder assembly at the second electrical facility.

12. The system of claim 11, wherein the processor at the off-site monitoring station is networked with each of the first imaging device at the first electrical facility and the second imaging device at the second electrical facility.

13. The system of claim 10, wherein the first imaging device is positioned in line of sight of one or more brushes of the brush holder assembly.

14. The system of claim 10, wherein the first imaging device is positioned in line of sight of one or more markers of the brush holder assembly for gauging the amount of wear of one or more brushes of the brush holder assembly.

15. The system of claim 10, wherein the processor includes a software program for analyzing the image acquired by the first imaging device.

* * * * *